United States Patent Office 3,165,821
Patented Jan. 19, 1965

3,165,821
COLORED METAL-GLASS COMPOSITES
Ernest J. Breton, West Grove, Pa., assignor to E. I.
du Pont de Nemours and Company, Wilmington, Del.,
a corporation of Delaware
Filed June 10, 1963, Ser. No. 286,746
17 Claims. (Cl. 29—182.5)

This invention relates to the manufacture of a novel material of construction, and particularly to colored glass-metal composites as well as a method of manufacturing such composites.

The search for new materials of construction is ceaseless, the objectives being not only the provision of materials of improved physical properties, preferably at a lower cost than competitive materials, but also the development of construction materials having unique decorative characteristics.

Figure 1:
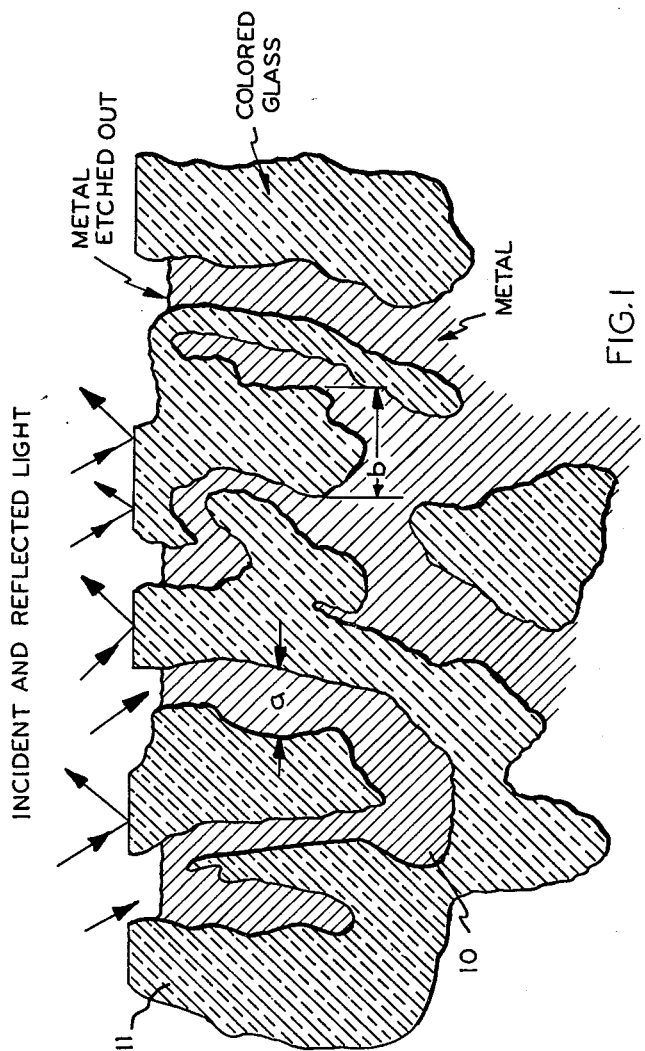
Figure 2:
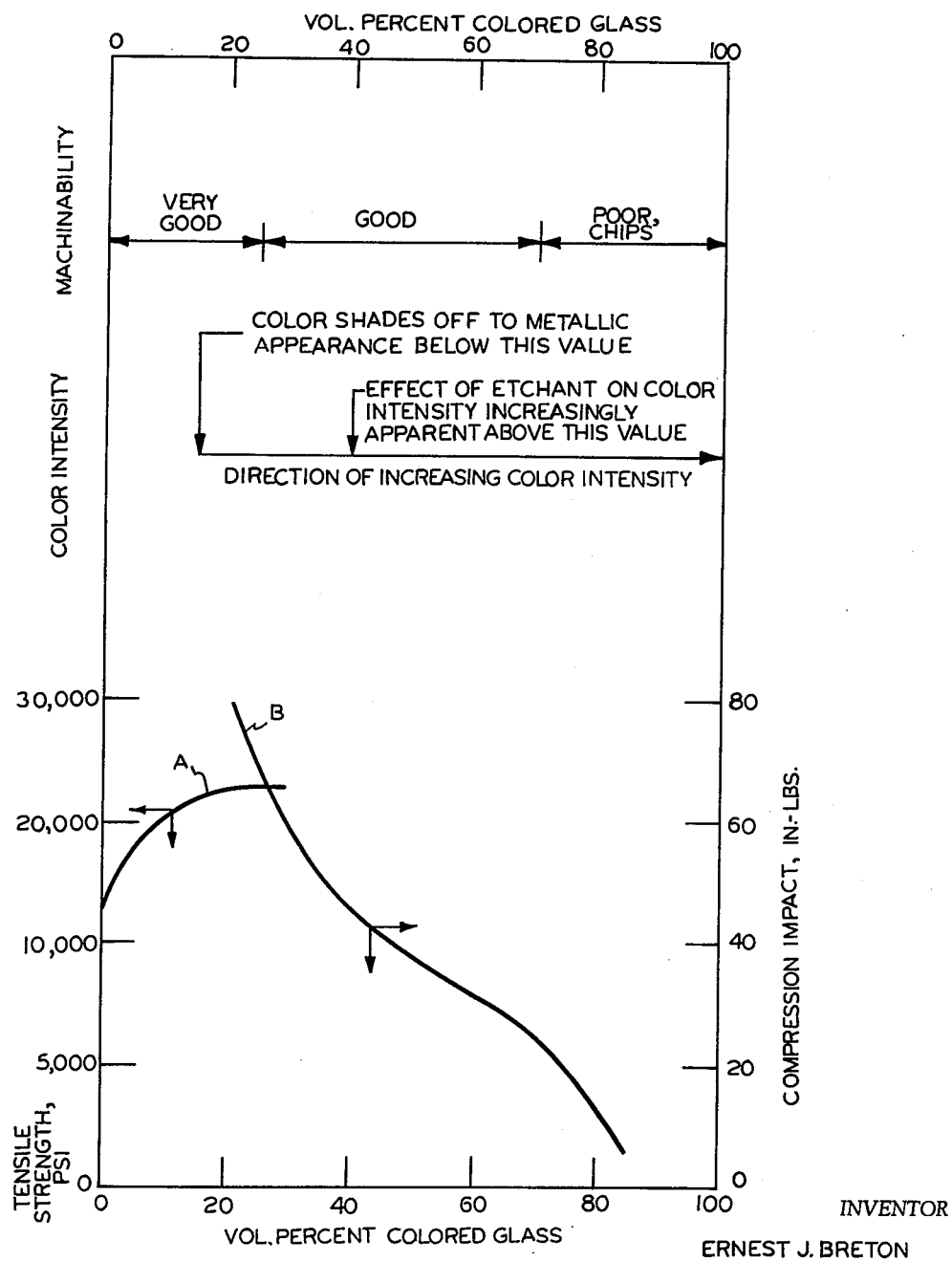

An object of this invention is the provision of a new material of construction having good physical properties, excellent resistance to weathering, a practically unlimited range of decorative possibilities and a price competitive with alternative materials of construction. Another object of this invention is the provision of a method of manufacturing colored metal-glass composites which is low in cost and adapted to the fabrication of colored stock to close standards of color fidelity. The manner in which these and other objects of this invention are attained will become apparent from the detailed description and the drawings, in which:

FIG. 1 is a greatly enlarged vertical section through a specimen of colored metal-glass composite manufactured according to this invention, which has been etched on the exterior surface, demonstrating the effect which etching has on incident and reflected light, and FIG. 2 is a general graphical representation of the strength, color intensity and machinability characteristics for aluminum-glass composites made up of homogeneously mixed 100 mesh metal—100 mesh glass, curve A being referred to the left-hand vertical axis and curve B to the right-hand vertical axis, respectively, as ordinate.

Generally, this invention consists of a material of construction colored throughout comprising powdered metal, glass and a colorant contained within the glass as vehicle, the colorant having a color fastness surviving the maximum temperature of the glass in its softened state, sintered and bonded to a substantially integral composite, and a preferred method of manufacturing the material.

Most materials of construction, particularly those having the necessary strength attributes, depend on protective coatings such as paint, enamel or the like for surface protection and decoration, except a few, such as stone, for example, which possess a relatively high inherent resistance to weathering and, in addition, a pleasing appearance in their natural state. There are usually serious problems of adhesion as regards protective coatings and, moreover, once the coating is pierced the underlying material is effectively opened to corrosive attack. In addition, most organic protective coatings are expensive and must be renewed periodically, not only to extend the time duration of the protection thereby afforded but also to restore the appearance, since protective coatings themselves deteriorate or are lost with the passage of time. Finally, and this is of great importance to architects and building suppliers, the decorative possibilities of protective coatings seem to have been completely exploited and, thus, there exists an urgent need for a novel material of great selective appearance versatility.

The material of construction of my invention is colored uniformly throughout and, consequently, is constantly renewed, even when weathered, chipped, abraded or otherwise broken in surface. Moreover, weathering does not constitute a serious problem for my materials, because of the very high resistance to weather action which they possess. Such a broad range of appearances, physical properties and machinabilities can be obtained with my metal-glass composites that the products are truly competitive with a number of primary building materials, such as, for example, stone, metal, porcelain-enameled metals, glass, wood, and polymers. This is not to say, however, that my materials are necessarily copies in appearance as regards competing materials, although they can, of course, be fabricated in designs hardly distinguishable from these mateials, but, most important, they confer, at choice, completely new and highly decorative effects limited only by the originality of the designer. In fact, the decorative attractiveness of the materials of this invention is so broad as to extend the utility of the products into fields entirely foreign to conventional building materials, such as those of furniture, tableware and even jewelry.

Referring to FIG. 1, the structure of my metal-glass composites consists, ideally, of two fine, substantially continuous, intimately interlocked and probably interbonded as well, highly irregular matrices of metal 10 and colored glass 11. Typically, an average dimension $a$ can be 150 microns, whereas, an average dimension $b$ can be 250 microns, corresponding to about 40 volume percent metal and 60 volume percent glass. Under these circumstances there is obtained a near-optimum balance of the strength and ductility properties of the metal with the corrosion resistance and color distribution contributed by the glass, making for a strong, machinable metal-glass composite possessing great weathering durability plus a pleasing color rendition. It will be understood, of course, that both the relative contents of the metal and glass phases, and also the relative thickness of the matrices of each, can be varied widely to obtain a predominance in properties conferred by each of these components, depending upon the environmental or appearance requirements of specific products. However, it is practically always desirable to maintain continuity of matrix structure, as verified, for the metal, by electrical conductivity tests, and, for the glass, by prolonged etching removal of all metal from the composites.

It will be further understood that some preselected variation in composite properties is also obtainable based on a judicious mating of properties of a specific metal component with a specific glass component, since there exists an extremely large number of both metals and glasses available for use according to this invention. Moreover, the particle sizes selected for each phase of the original mixture exert a great effect on both strength and appearance, as does the mechanical treatment to which the material is subjected, such as extrusion routines, building up of structures from a multiplicity of separate layers or striations of different materials prior to compaction and before sintering, and many other variations which will suggest themselves to the ingenuity of persons working with the composites. In this connection, the term "glass," as employed in this description and in the claims, is intended to include not only supercooled solid solutions conventionally thought of as glasses, but also the porcelain enamels as well. Also, the term "metal" is intended to comprehend alloys as well, the invention being equally applicable to these.

Typical metal-glass combinations which have been found eminently suitable in the practice of this invention include the following:

the color rendition, subjective in large part as all color rendition is, depends appreciably on this consideration. The role of the glass appears to be not only that of a vehicle for the colorant but, very importantly, a protective agency also, since the composites are subjected to severe conditions of both temperature and working in any preferred method of material fabrication.

The manufacture of colored metal-glass composites

TYPICAL COMPOSITIONS OF GLASSES, WT. PERCENT

| Metal | M.P. of Metal, °C. | Softening Pt. of Glass, °C. | $SiO_2$ | $Na_2O$ | $K_2O$ | $Li_2O$ | $B_2O_3$ | $P_2O_5$ | PbO | $Al_2O_3$ | $TiO_2$ | BaO | $SnO_2$ | $CaF_2$ | CaO |
|---|---|---|---|---|---|---|---|---|---|---|---|---|---|---|---|
| Zn alloys | 475–550 | 400–500 | 24.6 | 1.3 | 22.9 | | 3.0 | | 48.2 | | | | | | |
| Al | 660 | 500–600 | | 18.1 | 9.1 | | 3.4 | 41.3 | | | 24.7 | 2.4 | | 1.0 | |
| Al | 660 | 500–600 | 27.3 | 13.6 | 2.2 | 2.2 | | | | 37.0 | 13.4 | 4.3 | | | |
| Mg | 651 | 500–600 | 27.3 | 13.6 | 2.2 | 2.2 | | | | 37.0 | 13.4 | 4.3 | | | |
| Cu | 1,083 | 800–1,000 | 72.7 | 13.25 | | | | | | 1.06 | | | | | 13.0 |
| Fe | 1,535 | 800–1,100 | 51.1 | 17.8 | | | 16 | | | 7.7 | | | | 5.5 | 1.4 |

Excessive temperatures tend to degrade presently available colors, and it is therefore usually desirable to conduct the manufacture of the colored metal-glass composites at as low temperatures as feasible, having in mind the mechanical properties concurrently developed in the material. Commercial sintering practice has shown that metals and alloys have practicable sintering temperatures progressively lower than the actual metal melting points as one proceeds upward on the temperature scale, so that, whereas Zn, Mg and Al, and their alloys, sinter relatively near their melting points, Cu can be sintered appreciably lower than its 1083° C. melting point, while Fe and higher melting metals and alloys can be successfully sintered at temperatures hundreds of degrees below the respective melting points. This is a fortunate circumstance from the standpoint of colorant protection in the use of this invention, especially when aided by liquid metal sintering techniques, according to which small amounts of lower-melting metals are employed to effect a strong bond between more refractory metal particles. As a result, temperatures anywhere within about 100° C. of the commercial sintering temperatures, but below the metal melting point, are well-suited in the practice of this invention, it being understood, however, that temperatures as high as practicable usually result in the development of the best mechanical properties in the composites. Moreover, better products are obtainable if the glass component softens slightly below the sintering temperature of its metal associate; however, the match is not particularly critical and ±100° C. is a good enough accommodation in this respect.

Generally, good sintering of metals is obtained at temperatures in the range of about 67% to 95% of the melting points of the specific metals, sintering temperatures closest to the melting points prevailing for the lower-melting metals, whereas progressively greater departure occurs in the direction of higher melting point.

It is essential that the glass component function as the vehicle for the colorant employed. Fortunately, most glasses appear to tolerate a wide variety of different colorants well, subject, of course, to the limitation that the colorant must possess a color fastness surviving the maximum temperature attained by the glass component in its softened state once the colorant is added. Typical colorants which have been employed successfully in the practice of my invention include: CoO for blues, $Cr_2O_3$ for greens, $Fe_2O_3$ for browns, CdS for yellows, and a mixture of 40% CdS plus 60% CdSe for red. Color selection by blending of primary colors in accordance with conventional practice is completely practicable in metal-glass composite manufacture provided, of course, there is no color-destructive reaction of one colorant with another.

The colorants can exist in the glass either as a solute or as a dispersed phase, or as both, although, of course, according to this invention entails the use of largely conventional powder metallurgy techniques and is, accordingly, not detailed herein, except as involved in the following preparation of a specific group of composite materials.

This group consisted generally, of aluminum as the metal component, with pigmented or unpigmented frits as the glass component, which frits had the compositions taught for aluminum application in U.S. Patent 2,467,114. The non-colored frit base base had the following range analysis:

Mole percent
Lead Oxide (PbO) _____ 25–55
Silica ($SiO_2$) _____ 20–50
Titanium dioxide ($TiO_2$) _____ 1–15
Alkali metal oxide (e.g., $Na_2O$, $K_2O$, $Li_2O$) ____ 10–30

Specimens were produced with each of the individual colorants hereinbefore mentioned in concentrations ranging from about 0 to 40% weight percent of the frit, with the colorant added in some instance to the melt in the course of manufacture of the frit itself or as a mill addition, in which case the colorant and neutral frit constitute separate ingredients.

Using the latter course as the example, the neutral frit and pigment were first ground to a fineness such that the materials passed through a 325 mesh sieve. The mixture was then mixed intimately by wet ball-milling using, as a typical mill addition agent, a 10% water solution of $Na_2SiO_3$ supplied in quantity limited to that required to merely surface-wet the ingredients. A ball-milling time of, typically, 18 hours at 50 revolutions/min. using ¾" balls was sufficient to obtain an even distribution of the pigment on the frit.

After ball milling, the mixture was dried by heating to about 60° C. in the air, after which lumps were broken by light regrinding to obtain a particle size passing a 100 mesh sieve. Powdered aluminum of particle size 100% through a 100 mesh sieve was then added and the whole batch dry-mixed for typically 15 minutes. Concentrations of pigmented frit varying from about 10% by volume to about 65% by volume were prepared in this series, the lowest percentage displaying color, whereas the highest percentage retained sufficient mechanical strength to be usable in most decorative applications.

The intimate mixture was then cold-pressed into billets, using pressures ranging from about 5,000–30,000 lbs./in.$^2$, and then heated to 500–550° C. for periods of 45 minutes to sinter. Following this, the billets were hot-extruded or hot-forged immediately after removal in the hot condition from the furnace, thereby not only obtaining the final object shape but also increasing the product density to the desired level. It will be understood that hot-forging or extruding is not essential to the manufacture of composite structures, although these procedures do contribute densification and, therefore, improve the strength.

The mechanical properties obtainable according to this invention are portrayed very generally for colored 100 mesh Al —100 mesh glass composites in FIG. 2. It appears that tensile strength (curve A, referred to left-hand ordinate axis) is somewhat secondary importance to compression impact strength (curve B, referred to right-hand ordinate axis) for most uses of my composites which, as in building construction use and the like, will probably be called upon to resist impacts much more often than pulling stresses.

Nevertheless, the tensile strength increases to a maximum well within the 15–70% glass content preferred range of compositions while, at the same time, the impact strength decreases fairly sharply, but not at a prohibitive rate, to the acceptable minimum of 25 in.-lbs. for the upper limit glass content. Machining properties range from "very good" to "good" throughout the entire range, whereas color intensity increases generally in direct proportion to the glass content. The overall result is an excellent balance of all desirable attributes required of decorative and construction materials, and especially those materials which it is desired to shape with conventional tools and skills of the art.

It is sometimes helpful to clean the articles by light sanding, grinding or sand tumbling to remove contaminants picked up during the hot working. Single objects, or limited numbers of objects, are readily cleaned by wet grinding with 400–600 grit abrasive paper. The surface condition after this operation is very smooth and pleasant to the touch, the feel apparent being improved by the lower heat conductivity characteristic of metal-glass composites as compared with metals per se. The appearance at this stage in the manufacture can best be described as dull matte, or primarily metal-like, with the colors evident, but dull and subdued in hue, due to the fact that the metal ingredient is apparently smeared over the glass to such an extent that appreciable masking of the colored glass component by the metal exists. In some uses it is desirable to retain this appearance unchanged; however, in most, it is desirable to remove the masking by an etching treatment, and it has been found that a wide variety of esthetic effects are obtainable by the proper choice of etchant, duration of etching and, sometimes, by a post-etching treatment, such as waxing, buffing and the like.

Thus, a light etch removes the masking of the metal while retaining metal light-reflective faces adjacent the colored glass phase faces, giving metallic-appearing colors. On the other hand, a prolonged etching removes enough metal from the composite to indent the metal faces to a depth of as much as one mil, for example, as shown in FIG. 1, so that light reflected from the object consists primarily of that leaving the glass exterior, whereas the balance of the light is dispersed within the multitudinous metal-floored cavities. It will be apparent that a very wide range of unusual and pleasing effects can thereby be obtained. Also, if desired, one can mask out areas in either ornamental patterns, lettering or other configurations, to thereby impart a visually distinguishable effect as a result of selective etching action, which is an extremely useful route to the inexpensive obtainment of lettering imitation intaglios or the like.

A particularly useful etchant for aluminum-glass composites in a slurry made up of 5–10% $Ca(OH)_2$ in water, with or without 2–3% NaOH added for acceleration of the etching action and removal of any residue left by the lime. This is effective to purge the smeared Al metal without appreciable attack of the glass phase, which is desirable. Other etchants include the following water solutions (all reported percentages being by weight):

$Na_2SiF_4$ 0.15% + $NH_4NO_3$ 0.30%
$H_3PO_4$ 3% + $CrO_3$ 3%
$K_2CrO_4$ 0.01% + $NH_4OH$ 21%
$Na_2CrO_4$ 33% + $Na_2CO_3$ 13% + NaOH 13%

Etching can be conducted by brush application of the etchant or, most conveniently, by dip bath immersion for 10–30 minutes at room temperature, followed by thorough water rinsing and drying. It is stressed that the described etching functions differently with metal-glass composites than the conventional etching of metals or alloys, in that it serves to reveal the color inherent in the glass component of the material, as distinguished from color formation in the base substance resulting from chemical reaction.

In this connection, etching is singularly individualistic in the effects obtained. Thus, a $Ca(OH)_2$ slurry, free of any NaOH, produces an extremely pleasant tactile response, resembling a soapy texture of object surface with the color rendition approximating pastels in appearance. However, with NaOH present the feel changes to a sharp graininess, whereas the colors brighten, to a relatively high brilliance. The action of the $Ca(OH)_2$ etchant, both with and without added NaOH, intensifies with time, and this is true, in the main, as regards many other etchants experimented with.

In general, substances such as oxides of metals in Group II, Periodic Table, Lange's "Handbook of Chemistry," sixth edition (1946), having atomic weights in the range of 24 to 88 are effective as etchants in water solution. Moreover, these oxides (and also BaO) can be advantageously incorporated as an in situ ingredient of the composites, as hereinafter taught in Example 12, where ever-present appearance restoration capability is essential under circumstances where moisture is normally present in the atmosphere or environment.

Etching thus affords not only a convenient method for the preparation of material in the as-manufactured state but also for the complete restoration of metal-glass composite objects which may have suffered discoloration or change in appearance as a result of extensive handling or the like, as might be the situation with handles or other hardware on public buildings or similar installations.

Bearing in mind that the metal and glass components each possess their own integral properties, unimpaired by the association of the materials in the composite structure, additional treatments are practicable in accordance with the existing technology applicable to the individual materials per se. Thus, where Al is the metal ingredient, anodization (e.g., with electrolysis in a 15% by weight $H_2SO_4$ water solution at 30–100 v. D.-C. for 10–60 minutes at temperatures of 1–30° C.) can be resorted to, as hereinafter detailed in Example 7, to develop hard oxide coatings on exposed Al metal faces. Dissolution of smeared metal obscuring the colored glass phase occurred simultaneously with the anodization, so that etching for this purpose proved unnecessary.

Anodization of the exposed Al face metal has no adverse effects on mechanical properties and, in fact, contributes an improved wear surface due to the increased hardness of the metal phase component exterior. However, the great advantage of anodization is that there is thereby created a metal porosity which is receptive to organic dyes in accordance with known practice, affording yet another avenue of color impartation, so that both the metal and the glass phases can be independently colored.

The following specific examples furnish details of fabrication in supplementation of the general description hereinbefore set forth.

*Example 1*

Minus-100 mesh Aluminum Association Type 1100 Al powder was mixed in the proportions hereinafter tabulated with ground glass (100% through a 100 mesh screen) of the following composition by weight: PbO 34.3%, $SiO_2$ 27.3%, $Li_2O$ 2.2%, $Na_2O$ 13.6%, $K_2O$ 2.2%, $TiO_2$ 13.4%, $Sb_2O_3$ 2.7%, BaO 4.3%. The glass had previously been mixed with cobalt oxide blue pigment in the weight ratio of 5 parts glass to 1 of pigment. The mixture was cold-pressed at 15,000 lbs./in.² into 2" x 1½" x 1" billets, which were then heated to 560° C. and forged to final shape. The specimens were then cleansed by surface grinding with 600-grit paper and thereafter immersed for 10 minutes in a 3.2% $Ca(OH)_2$ slurry in water containing, also, 2% NaOH, followed by rinsing and drying.

RESULTS

| Sample (Vol. percent) | Surface Appearance |
|---|---|
| Al+10% pigmented glass | Light blue, rough surface. |
| Al+20% pigmented glass | Do. |
| Al+30% pigmented glass | Darker blue, surface less rough. |
| Al+40% pigmented glass | Dark blue, smooth surface. |
| Al+60% pigmented glass | Deep blue, very smooth surface. |

*Example 2*

The procedure of Eaxmple 1 was repeated, except that, after grinding, the billets were immersed for 10 minutes at 200° F. in a solution consisting of a mixture of 3 oz. $K_2CrO_4$/gal. of $H_2O$ with 8 oz. $Na_2CO_3$/gal. of $H_2O$, and then rinsed and dried.

| Sample (Vol. percent) | Surface Appearance |
|---|---|
| Al+10% pigmented glass | Light blue grey, very smooth surface. |
| Al+20% pigmented glass | Blue grey, very smooth surface. |
| Al+30% pigmented glass | Do. |
| Al+40% pigmented glass | Do. |
| Al+60% pigmented glass | Dark blue, very smooth surface.[1] |

[1] Appearance and feel of polished stone.

*Example 3*

Minus-100 mesh Al powder was mixed with 54 vol. percent of ground glass of the same analysis as Example 1, together with 6 volume percent red pigment (40% CdS plus 60% CdSe). The mix was cold-pressed at 15,000 lbs./sq.in. into a 2" x 1½" x 1" billet, then heated to 550° C. and forged into a billet of generally curved edge 2½" x 2" x ½" thick. A drawer handle was machined out of the hot-forged billet using conventional procedures. Masking tape in the form of a wavy line was adhered on the outer surface of the handle, which was then immersed for 3 minutes at 40° C. in a $Ca(OH)_2$ water slurry containing 2% added NaOH, rinsed and dried. After the tape was removed, the handle had the appearance of a maroon-red stone having an inlaid metal strip emplaced in the outer surface.

*Example 4*

A plate was fabricated from a billet made up as described in Example 3. This was etched at 180° F. in a solution containing 3 oz./gal. alkali hydroxide to give a maroon-red, stone-like appearance. Then the surface was gouged about 1⁄16" deep with a chisel, which obscured the color, presumably by smearing metal over the glass phase. The maroon-red color was restored in the scratches by a 30-minute room temperature treatment with a 10-oz./gal. alkali hydroxide solution. The color contrast presented by the scratches was obliterated by this treatment.

*Example 5*

Two billets were fabricated from 100 mesh Al and ground glass, the glass content being about 60 volume percent clear glass. In the first composite, glass of the same composition as that described in Example 1 was used. It was heated to 550° C. and then immediately forged. In the second composite, window glass typically analyzing, in weight percent: $SiO_2$ 74.2, $Na_2O$ 17.7, MgO 3.2, and CaO 4.3 was used. To achieve densification, forging of the second composite had to be conducted at 700° C. The first composite could be easily and cleanly drilled with a 3⁄16" drill of excellent quality without destructive effect on the drill. In contrast, the composite made from the window glass could not be drilled without severe chipping. Also, the cutting edge of the drill used on the window glass composite was destroyed.

This example demonstrates the effect of a poor match of glass softening point with associated metal sintering temperature, in that the window glass softened at such a high temperature as to apparently be somewhat isolated, glass particle with respect to glass particle, by the surrounding metal. The result was a structure wherein the glass component had a tendency to be pulled away as separate particles, with consequent chipping, as compared with smooth, controlled metal-glass removal for the first composite.

*Example 6*

Al-glass composites containing CoO blue pigment in the amount of 20% by volume of the glass phase were prepared by hot forging (550 to 600° C.) cold-pressed compacts of mixtures of powdered Al and ground glass of the composition of Example 1. The most pronounced effects of increasing the percentage glass content consisted of an increase in hardness with accompanying decrease in impact strength. The physical properties obtained were as follows for the volume percent glass contents tabulated:

| Test | 0% Glass | 20% Glass | 40% Glass | 60% Glass |
|---|---|---|---|---|
| Tensile Strength, p.s.i | 14,800 | 14,000 | 12,600 | 5,000 |
| Flexure Strength, p.s.i | | 22,300 | 16,400 | 11,800 |
| Compression Yield, p.s.i | 15,000 | 32,000 | 35,000 | 37,000 |
| Charpy Impact (2" Span, 0.3" Specimen), ft. lb | | 2.0 | 0.28 | 0.12 |
| Charpy Impact (1" Span, 0.25" Specimen), ft. lb | | 1.3 | 1.3 | 1.2 |
| Hardness, Brinell | 15 | 38 | 69 | 105 |
| Thermal Conductivity cal./cm.$^2$/°C./sec./cm | 0.52 | 0.177 | 0.104 | 0.100 |
| Electrical Resistance, ohm/cm | 2.8×10$^{-6}$ | 4.4×10$^{-6}$ | 93×10$^{-6}$ | 4,950×10$^{-6}$ |

*Example 7*

Samples of metal-glass composites prepared in the compositions reported in Example 1 were anodized in a 15% by weight solution of $H_2SO_4$ in water at 30 v. D.-C. for 20 minutes at a temperature of 3° C. using a lead sheet as cathode.

The specimens were rinsed in hot water for 30 minutes and displayed a deep sky-blue color very resistant to wear.

*Example 8*

An unusually attractive metal-glass composite possessed of a delicate miniature leopard marking of turquoise shade was prepared as follows:

Glass of the same composition as taught in Example 1 was ball-milled with 20% by weight of blue-green pigment consisting of a sintered cobalt chrome spinel. This mixture was sintered by heating at 600° C. for 30 minutes and reground to pass a 100 mesh screen. The ground material was then intimately mixed with 50% by volume of minus 100-mesh Al powder and cold pressed at 40,000 p.s.i. into billets 2" x 1.5" x 2". The billets were sintered at 560° C. by heating for 1 hour and then broken up and reground to a fineness passing an 8 mesh screen but retained on a 100 mesh screen.

The latter material was intimately mixed with 50 volume percent of minus 80 mesh Al, cold pressed at 40,000 p.s.i., sintered for 1 hour at 560° C. and hot forged.

The resulting composites were polished with 240 grit abrasive paper and etched by immersion for 30 minutes in a saturated water solution of $Ca(OH)_2$ containing 2% NaOH.

A pleasing pattern of turquoise spots distributed throughout a silver matrix was obtained. The spots were of somewhat elongated, irregular shape of quite uniform 0.03125" length dimension separated one from another at irregular spacings ranging from immediate adjacency to about 0.0625" apart, or sometimes more.

Other work on similar compositions wherein the composites were hot extruded and forged showed the complete practicability of elongating the colored glass component into visible stringer patterns having lengths ranging up to 50 or more width dimensions where the width was typically 0.01" or less, thereby obtaining a pattern resembling that of mahogany wood in appearance.

*Example 9*

An unusual antique gold effect was obtained in the following manner:

100 mesh size Al was intimately mixed with 25% by volume of chromate yellow-colored glass ground to pass a 100 mesh screen and analyzing (mole percent): PbO 13.3, $SiO_2$ 39.2, $Li_2O$ 6.4, $Na_2O$ 19.0, $K_2O$ 2.0, $TiO_2$ 14.5, $Sb_2O_5$ 0.78 and $CrO_3$ 4.8, the mixture being then cold compacted under 40,000 p.s.i. pressure and thereafter sintered by heating to 560° C. for 1 hour and finally forged.

This experiment was repeated exactly as hereinbefore described, except that the colored glass content was increased to 41% by volume. The composite product color was deepened appreciably in intensity and, in addition, the texture was improved to a state quite soft to the touch, as compared with a very slight graininess for the lower glass content material.

*Example 10*

A colored Cu-glass composite was prepared as follows:

220 gms. of a commercial glass having the composition in weight percent of $SiO_2$ 74.2, $Na_2O$ 17.7, MgO 3.2 and CaO 4.3, with a softening temperature of about 800° C., was wet-mixed with 80 gms. of cobalt oxide blue, such as Du Pont Co. J. 757, and thereafter dried and ground to pass a 100 mesh screen.

150 gms. of this blue glass powder was mixed with 450 gms. of −100 mesh pure Cu powder, giving a mixture containing about 50 volume percent of glass, and a billet measuring 2" x 1.5" x 1" thick prepared by cold pressing at 90,000 p.s.i.

The billet was heated in a $H_2$ atmosphere to a temperature of 900° C. and then forged to a final thickness of about ½", after which the billet was allowed to cool in air and was then sanded with 240 grit abrasive paper. The appearance at this point was that of dull copper with a faint lavender tint.

The billet was then immersed in 10% $HNO_3$ solution for 20 minutes, which brought out the blue color of the glass phase against a faint copper background. The color appearance of the composite was deepened from a lavender hue to a deep blue with increased $HNO_3$ etching.

*Example 11*

This example was directed to be objective of making an article from two different, distinctively colored metalglass composites in a manner producing alternating strips of one color adjacent another.

The first colored glass was made up by intimately mixing 1000 gms. of −325 mesh glass of the analysis of Example 1 with 75 gms. of a mill addition agent made up of water glass 15.4% KOH 35.4% and boric acid 49.2% which served as a color binder, together with 300 mgs. of $TiO_2$ white pigment of less than 1 micron particle size, all in 400 gms. $H_2O$.

The second colored glass was made up in exactly the same proportions as the first glass, except that the colorant in this case was 300 gms. of $Fe_2O_3$ of less than 1 micron particle size.

Each of the glass-containing mixes was separately filtered, dried and ground to pass a 100 mesh screen, after which each was mixed separately with −100 mesh Al powder in the ratio of 2.6 parts by weight of the glass-containing component to 1 part Al, so that the final mixtures obtained were about 65% by volume glass.

Then alternate ¾" layers of each colored glass—Al powder mix were poured into a 3" diameter polymeric cylinder serving as a mold and some boundary intermixing obtained by a single gentle stirring with a metal rod. The mold was then placed in a press and the mix hydrostatically compacted at 40,000 p.s.i. producing a self-sustaining billet from which the polymer jacket was readily stripped. This billet was sintered by heating for 2 hours at 530° C. in an argon atmosphere. The sintered billet was cooled and machined to the form of a pen holder of general hemispherical form slightly over 3" diameter, provided with a 2.125" planar face extending (with slope inclined downwardly from left to right) from about 11:45 o'clock position to about 2 o'clock position. The machining was smoothly and easily accomplished in spite of the relatively high glass content of the composite.

The pen holder was etched by immersion overnight in a water bath containing about 5% $Ca(OH)_2$ maintained at 28° C. After thorough rinsing with warm water to remove excess $Ca(OH)_2$ from the surface, the appearance was flat and stonelike, with full retention of the two-part colored effect in the form of striations, even in boundary regions where considerable "feathering" of one colored composite occurred with respect to another. Very pleasing color harmony was obtained for this object, and the same could be said of another example wherein a relatively ornate funnel-like lamp base was machined from a billet prepared by a similar procedure employing, however, a $Cr_2O_3$ green pigmented composite in conjunction with a $TiO_2$ whitened composite.

*Example 12*

This example demonstrates the practicability of incorporating the effective etching agency directly in the colored metal-glass composite.

A glass component consisting, in terms of volume percent, of 80% −100 mesh ground glass, 15% CoO blue pigment and 5% powdered CaO was ball-milled for ½ hour, compacted at 10,000 p.s.i. and sintered for 2 hours at 600° C. in argon. The sinter was then ground to pass an 80 mesh screen and mixed with 50 volume percent Al, −100 mesh. The resulting mixture was cold pressed at 10,000 p.s.i. heated to 540° C. for 2 hours and hot forged.

The object obtained was surface-finished by rubbing with 80 grit paper, thereby revealing a faint sky-blue color not apparent in a similarly treated 50 volume percent Al, 50 volume percent blue glass specimen, free of any CaO, which was prepared as a control.

Upon immersion in water for 15 hours the color of the CaO-containing specimen intensified markedly, whereas the control remained unaffected. The control was later given an etch with 5% $Ca(OH)_2$ slurry in water, whereupon it took on the same general appearance as the specimen prepared with CaO as ingredient.

From the foregoing it is apparent that colored metal-glass composites incorporating an etchant principle such as CaO, BaO or SrO for example, can be made self-restoring in color and appearance where conditions permit occasional wetting, as by exposure to out-of-doors' weathering, or even as a result of occasional washing with water alone, which is advantageous in situations where excessive or rough handling is in prospect, as in outside hardware and the like.

*Example 13*

This example was directed to the preparation of a colored iron-glass composite.

50 volume percent of −150 mesh pure Fe powder was mixed with 50 volume percent of −325 mesh brown-colored glass having the analysis (weight percent): $SiO_2$ 72.7, $Na_2O$ 13.25, $Al_2O_3$ 1.06 and CaO 13.0 and incorporating, in addition, 20 volume percent $Fe_2O_3$ brown pigment. The softening point of the colored glass was approximately 800° C.

The glass and pigment were first ball-milled together for 3 hours prior to addition of the Fe powder, after which ball milling was continued for an additional 10–15 minutes. The colored metal-glass mixture was cold-compacted into 2" x 1½" x ¾" billets at 100,000 lbs. pressure, inserted into a $H_2$ atmosphere furnace maintained at 850° C. for 20 minutes, and forged at this temperature.

The forged billet was surface-ground with a 240 grit belt and then etched in a 10% HNO₃ solution for 3–4 minutes, producing a deep chocolate brown-colored composite of extremely smooth, pleasant-to-the-touch surface feel.

*Example 14*

This example involved the preparation of a metal-glass composite distributed throughout a sintered all-glass matrix.

First, glass of the composition taught in Example 1 was ground to −325 mesh and with this was intimately mixed 10 volume percent of −325 mesh commercially available $CoO$—$Cr_2O_3$ turquoise pigment (Du Pont J. 750), after which the mix was cold-compacted at 10,000 lbs./sq. in. and then sintered at 580° C. The sinter was then ground to pass a 100 mesh screen.

Second, the colored ground glass was intimately mixed with −100 mesh Al metal and this mix cold-compacted at 10,000 lbs./sq. in. and then sintered at 580° C. This composite sinter was then ground to about 1/16" particle size.

Third, the particulate composite was mixed in the proportion 50 volume percent to 50 volume percent with −100 mesh clear glass of the same analysis as that of Example 1, after which the mix was cold-compacted at 10,000 lbs./sq. in. and sintered at 580° C., following which the product was hot-forged from a thickness of about 3/4" to about 1/4". Finishing consisted of merely sanding with a 240 grit belt, without etching.

The result was an opaque material bearing some resemblance to the specimen of Example 8, except that the distributed particles were more rounded in shape and arranged in a cell-like pattern with the shiny, light-reflective metal effect disproportionately evident, probably due to smearing. Under close inspection, there existed considerable iridescence, whereas at a distance of one foot the appearance was finely mottled in a variety of pastel hues ranging from green-yellow through pinkish-tan and finally lavender. The general effect was beautifully decorative and the feel was of extreme slippery smoothness.

As a general practice, it is preferred to incorporate the colorant within the glass component before any metal is added, since I have found that the metal frequently takes up colorant in one way or another with consequent reduction in color intensity in the products obtained. Nevertheless, in some instances subdued color effects can be desirable and then colorant addition to the metal-glass mixture affords one convenient route to this end.

The examples demonstrate the versatility of pattern and color obtainable with the composites of this invention, ranging from those resulting from special manipulations performed on the separate or combined powders charged in alternation one with another before the sintering to special extruding or forging operations which exert effects on the composites after integration. It is additionally practicable to develop delicate bridging color gradations in such variegated structures by interface reactions between neighboring glass phases. These capabilities render the composites an attractive new medium of expression for sculptors and other artists, especially in view of the ease of workability of the material. In addition, the metal-glass composites inherently possess a very high resistance to weathering and corrosion, which can be enhanced by the incorporation of certain additives such as those disclosed in U.S. patent application Ser. No. 286,856, filed of even date herewith.

In addition, the composites are readily applied as coatings on metals and other backings by hot spray-gun application, or by fluidized solids deposition techniques, which render them well-suited to widespread decorative coating utilization.

My composites can be fabricated in thicknesses as low as 1/16" and, moreover, permit considerable savings in weight over some of the heavier metals which they can replace. Thus, aluminum metal-glass composites of 50–50 volume percent composition have densities as low as 2.5 gm./cm.³ where light weight borosilicate glass is employed, increasing to about 3.4 gm./cm.³ for the heavier glasses. Comparatively, Al itself is about 2.7, low-melting glass 3.8, high-melting glass 2.5, low C steel 7.8 and Cu 8.9 gm./cm.³. Iron-glass composites of 50-50 composition have a density of about 5 gm./cm.³, whereas 50-50 Cu composites are around 5.6, so that metal weight savings of the order to 30% or more are obtainable in the practice of this invention in cases where the heavier metals constitute the metal component.

From the foregoing, it will be apparent that this invention is subject to wide modification without departure from its essential spirit, and it is intended to be limited only within the scope of the appended claims.

What is claimed is:

1. A manufacture comprising a material of construction consisting of a sintered metal-glass composite made up of an intimate mixture of powdered metal, ground glass and a colorant contained within said glass as the vehicle, said colorant having a fastness surviving the maximum temperature of said glass in its softened state, and wherein said temperature of said glass in its softened state is within about ±100° C. of the sintering temperature of said metal but below the melting point of said metal.

2. A manufacture according to claim 1 wherein said glass constitutes from about 15% to about 70% by volume of said composite.

3. A manufacture according to claim 1 wherein said metal consists of at least one of the group Zn, Al, Mg. Cu and Fe, and their alloys, in proportions ranging from about 30% to about 85% by volume of said composite.

4. A manufacture according to claim 1 wherein said colorant consists of at least one substance from the group made up of CoO for blue coloration, $Cr_2O_3$ for green coloration, $Fe_2O_3$ for brown coloration, CdS for yellow coloration, and CdS plus CdSe for red coloration.

5. A metal-glass composite consisting of the manufacture according to claim 1 distributed in particulate state throughout a sintered all-metal matrix made up of a metal having a sintering temperature not exceeding the melting temperature of said metal constituting a component of said manufacture of claim 1.

6. A manufacture according to claim 1 having the exterior surface etched with a substance attacking one component of said metal-glass composite at a different rate than the other component.

7. A manufacture according to claim 1 having the exterior surface etched with a water solution of an oxide of a metal within Group II of the Periodic Table having an atomic weight in the range 24 to 88, inclusive.

8. A manufacture according to claim 1 containing, in addition, up to about 5% of an oxide of a metal within Group II of the Periodic Table having an atomic weight in the range from 24 to 88, inclusive, as an ingredient in said glass-metal composite.

9. A manufacture according to claim 1 having the exterior surface etched with a water solution of an oxide of a metal within Group II of the Periodic Table having an atomic weight in the range 24 to 88, inclusive, containing, in addition, up to about 3% NaOH.

10. A manufacture according to claim 1 containing, as said metal, a metal which can be surface-anodized.

11. A metal-glass composite consisting of a sintered mass of a plurality of differently colored manufactures according to claim 1.

12. The method of manufacture of a colored metal-glass composite comprising, in sequence, intimately mixing ground glass, a colorant having a fastness surviving the temperature of said glass in its softened state, and a powdered metal, said temperature of said glass in its softened state being within about ±100° C. of the sintering temperature of said metal but below the melting point of said metal, cold compacting the mixture of said glass, colorant and metal under a pressure sufficiently high to produce a self-sustaining compact therefrom, and then heating said compact to the sintering temperature of said metal.

13. The method of manufacture of a colored metal-glass composite according to claim 12 wherein said colorant is thoroughly incorporated with said glass prior to mixing in said metal.

14. The method of manufacture of a colored metal-glass composite according to claim 12 wherein said compact is hot worked extensively by forging, extrusion or other densification procedure while heated to substantially said sintering temperature of said metal.

15. A method of manufacture of a colored metal-glass composite according to claim 12 wherein said composite is surface-etched by contacting said composite with a substance attacking one component of said metal-glass composite at a different rate than the other component.

16. A method of manufacture of a striated metal-glass composite comprising, in sequence, making up individually different, distinctively colored metal-glass composites according to claim 1, grinding said individually different, distinctively colored metal-glass composites to particulate state, disposing said metal-glass composites in particulate state one adjacent another in the preselected patterned arrangement desired in the final composite structure, and then firing said metal-glass composites at the highest sintering temperature corresponding to the metals in said individually different, distinctively colored composites according to claim 1.

17. A metal-glass composite consisting of the manufacture according to claim 1 distributed in particulate state throughout a sintered all-glass matrix made up of a glass having a softening temperature not exceeding the melting point of said metal constituting a component of said manufacture of claim 1.

References Cited in the file of this patent

UNITED STATES PATENTS

| | | |
|---|---|---|
| 2,274,830 | Gould et al. | Mar. 3, 1942 |
| 2,280,169 | Stroup | Apr. 21, 1942 |
| 2,415,036 | Quinn | Jan. 28, 1947 |
| 2,932,071 | Whitehurst | Apr. 12, 1960 |
| 3,010,824 | Herenguel et al. | Nov. 28, 1961 |
| 3,047,383 | Slayter | July 31, 1962 |
| 3,047,409 | Slayter et al. | July 31, 1962 |